(12) United States Patent
Inoue

(10) Patent No.: US 7,706,970 B2
(45) Date of Patent: Apr. 27, 2010

(54) PASSENGER LOCATION INFORMATION SYSTEM, PORTABLE INFORMATION TERMINAL, AND SERVER

(75) Inventor: Yutaka Inoue, Tokyo (JP)

(73) Assignee: NEC Corporation, Tokyo (JP)

(*) Notice: Subject to any disclaimer, the term of this patent is extended or adjusted under 35 U.S.C. 154(b) by 1382 days.

(21) Appl. No.: 11/043,119

(22) Filed: Jan. 27, 2005

(65) Prior Publication Data

US 2006/0041374 A1    Feb. 23, 2006

(30) Foreign Application Priority Data

Jan. 28, 2004    (JP)    ............................. 2004-020126

(51) Int. Cl.
    *G01C 21/36*    (2006.01)
(52) U.S. Cl. ..................... 701/207; 209/200; 340/992
(58) Field of Classification Search ......... 701/200–213; 340/989, 990, 992, 993, 994
    See application file for complete search history.

(56) References Cited

U.S. PATENT DOCUMENTS

| | | | |
|---|---|---|---|
| 7,200,411 B2 * | 4/2007 | Watanabe et al. | 455/456.4 |
| 7,430,472 B2 * | 9/2008 | Zhao et al. | 701/201 |
| 7,444,210 B2 * | 10/2008 | Breed et al. | 701/1 |

FOREIGN PATENT DOCUMENTS

| | | |
|---|---|---|
| CN | 1345413 | 4/2002 |
| JP | 10-232992 A | 9/1998 |
| JP | 2001-241964 A | 9/2001 |
| JP | 2002-114149 A | 4/2002 |
| JP | 2002-300634 A | 10/2002 |
| JP | 2003-217093 A | 7/2003 |
| WO | 01/77621 A1 | 10/2001 |
| WO | WO 02/075692 | 9/2002 |
| WO | WO 03/021191 | 3/2003 |

OTHER PUBLICATIONS

Bai Jing, China Economic Daily; Oct. 15, 2002; "Green casket' opens the doors of intelligent traffic".

* cited by examiner

*Primary Examiner*—Richard M. Camby
(74) *Attorney, Agent, or Firm*—Sughrue Mion, PLLC

(57) ABSTRACT

The present invention provides a passenger location information system that provides information on the current location of a user during a trip in real time and in a mode suitable for each user. A configuration is provided in which passenger location information, at least including information on the ends (station, stop, etc.) of a transportation line interval in which a portable information terminal is located, is output at a predetermined time on a user terminal 1 such as a mobile phone terminal connectable to a network. In addition, using notification means such as a ringing tone or a vibrator, the user terminal 1 notifies the user, under a condition set by the user in advance, that the user is approaching a destination to prevent the user from riding past a destination due to dozing.

27 Claims, 10 Drawing Sheets

FIG. 2

| LOCATION INFORMATION P | INTERVAL INFORMATION |
|---|---|
| A001 | SHINAGAWA <=> TAMACHI |
| : | : |
| : | : |
| : | : |

FIG . 5

| LOCATION INFORMATION $P_{t-1}$ | LOCATION INFORMATION $P_t$ | INTERVAL INFORMATION |
|---|---|---|
| A001 | A002 | SHINAGAWA >=> TAMACHI |
| : | : | : |
| A002 | A001 | TAMACHI >=> SHINAGAWA |
| : | : | : |

FIG. 7

| INTERVAL | REQUIRED TIME (MINUTES, SECONDS) |
|---|---|
| SHINAGAWA-TAMACHI | 3′ 00″ |
| TAMACHI-HAMAMATUCHOU | 2′ 00″ |
| ⋮ | ⋮ |
| ⋮ | ⋮ |

FIG . 8

| INTERVAL | REQUIRED TIME (SECONDS) |
|---|---|
| A001—A002 | 30″ |
| A002—A003 | 20″ |
| ⋮ | ⋮ |
| ⋮ | ⋮ |

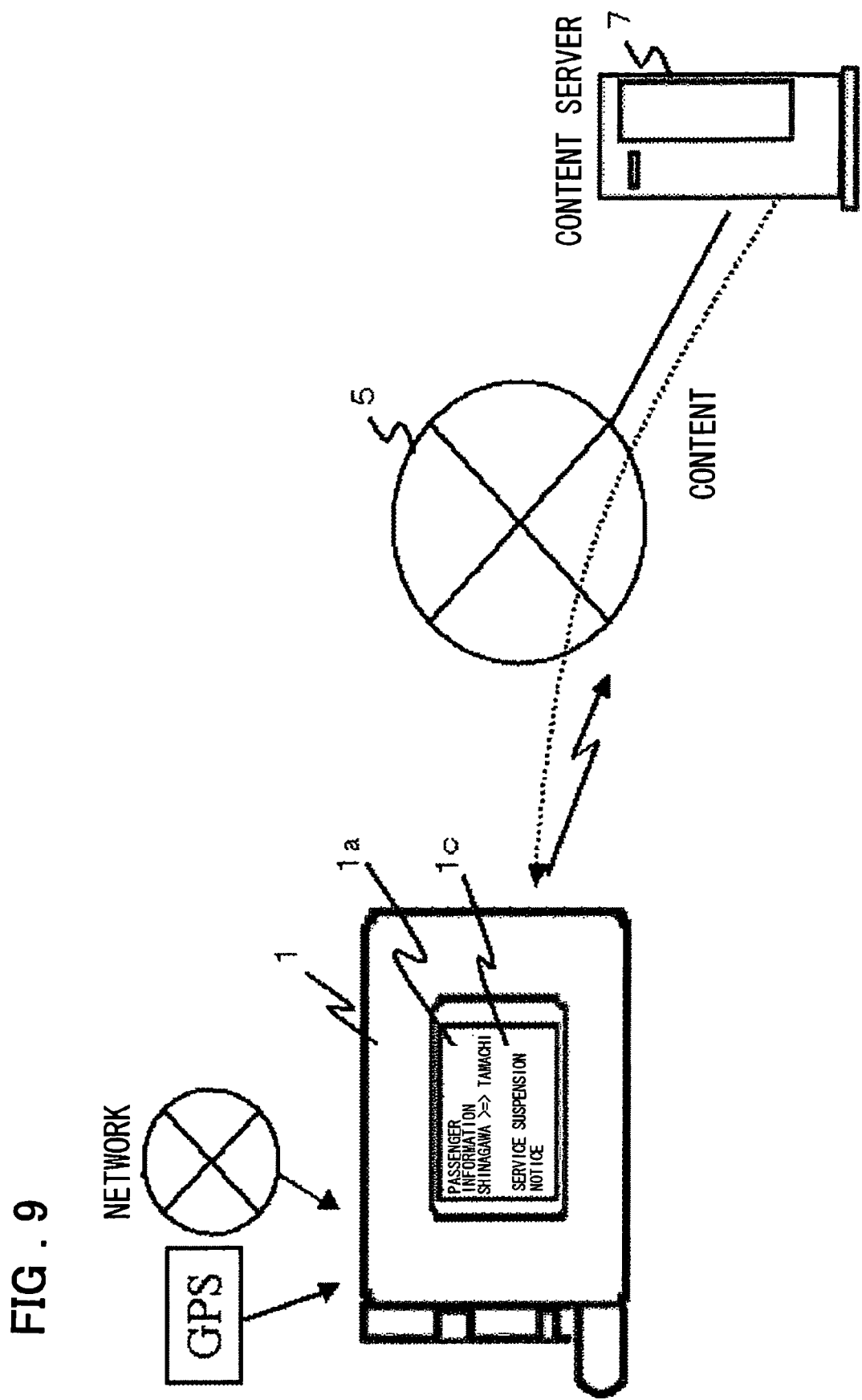

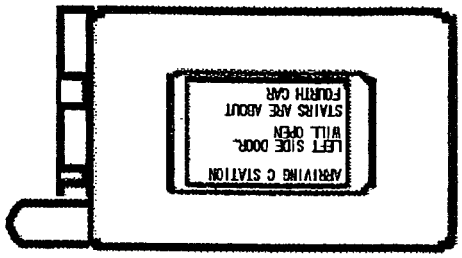
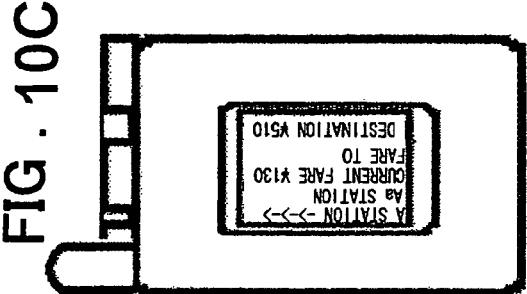
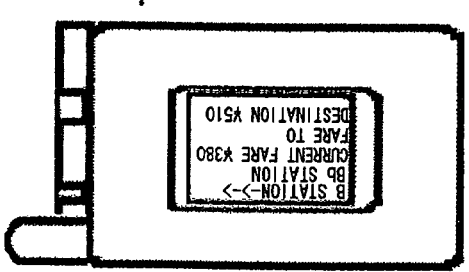
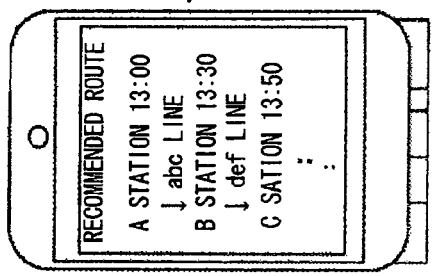
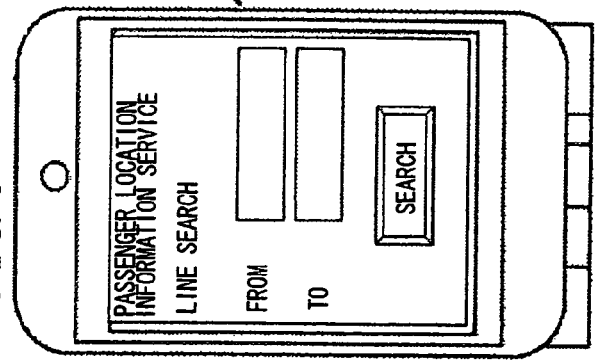

PASSENGER LOCATION INFORMATION SYSTEM, PORTABLE INFORMATION TERMINAL, AND SERVER

FIELD OF THE INVENTION

The present invention relates to a passenger location information system and a portable information terminal and server used in this system.

BACKGROUND OF THE INVENTION

Guidance services for transportation passengers include a conventional in-car announcement and color-based guidance information, provided in a station and a stop, that helps passengers to identify the number of a station or a stop displayed in a graphic, whose color is predetermined for each line, so that they can instantly know where they are. Another service widely used today is an electric bulletin board installed in a car for guidance. In particular, the widespread use of a widefield, low profile display enables rich content to be provided. Because this display is effective especially in a crowded car or for hearing-impaired persons, the passenger transportation companies compete for introducing this type of display to provide better services than those of others.

Passengers, who use transpiration in an unfamiliar area or who use an unfamiliar transportation line, must be careful about where they should leave the train, how long it will take, and how much the fare is and they are sometimes feel uneasy. As a result, passengers cannot pass a comfortable time in a car in some cases. In addition, even in the frequently used transportation, passengers sometimes ride past their destination; for example, when they concentrate on reading or composing mail messages or have a chat with fellow passengers, they fail to notice the station plate or the scenery seen from a car window.

In view of the foregoing, some passenger guidance methods, which use a personal portable information terminal such as a mobile phone, are proposed. For example, Japanese Patent Kokai Publication No. JP-P2002-300634A discloses a mobile communication terminal notification system for railway passengers. In this system, the user uses a communication terminal, in advance, to send a message reception condition and registers it with a communication network server via the information processing system of the train. When the location of the communication terminal and the location of train satisfy the message reception condition, the user receives the message notification signal. Japanese Patent Kokai Publication No. JP-P2002-114149A also discloses a device that combines the transportation line network database, the transportation route search server, and the transportation route derivation server to provide guidance information to the transportation users.

[Patent Document 1]
Japanese Patent Kokai Publication No. JP-P2002-300634A

[Patent Document 2]
Japanese Patent Kokai Publication No. JP-P2002-114149A

SUMMARY OF THE DISCLOSURE

However, the method using a personal mobile information terminal described above requires the user to set a message reception condition each time the user uses it. For the transportation used daily for commuting, the user is required to set a message reception condition only once; however, once the condition is set, the message reception operation is started or the guidance message is notified automatically and, as the user uses this system repeatedly, it is likely that the effect will be reduced significantly. In addition, when the message reception sound, which notifies that the message is received, is turned off or when the user fails to hear the guidance information, the user feels uneasy or rides past the destination.

If the user can easily receive information on the current location during a trip without having to set a message reception condition in advance using the user's communication terminal as in the method disclosed in Japanese Patent Publication Kokai JP-A No. 2002-300634, passengers who require time in getting on or off a car or passengers carrying much baggage or a baby could get on or off a car at their own pace. This also removes anxiety about transportation.

If user's location information is provided to the user during a trip in real time and, more preferably, in a mode suitable for the situation of the user, it would be very convenient and give something to watch to the user in a car. In view of the foregoing, it is an object of the present invention to provide a passenger location information system, a mobile information terminal used in this system, and a server that can provide the user with user's location information during a trip in real time and in a mode suitable for the situation of the user.

According to a first aspect of the present invention that provides means for solving the above problems, there is provided a passenger location information system using a portable information terminal and an apparatus such as a portable information terminal used in the system. First, a server accessible from the portable information terminal comprises means for determining a transportation line interval, in which the portable information terminal is located, from location information on the portable information terminal. The portable information terminal comprises location information acquisition means for acquiring location information on the portable information terminal from the GPS, station information, and so on. When a predetermined input operation is performed (operation on predetermined buttons, input from external source), the portable information terminal moves to a passenger location information providing mode and sends the location information on the portable information terminal, acquired from the location information acquisition means at a predetermined time interval, and the destination information to the passenger information server. The passenger information server sends the determination result of the transportation line interval in which the user terminal that sent the location information is located. Next, the portable information terminal outputs passenger location information, which at least includes information on the names of the locations constituting the interval, at a predetermined time defined as necessary, for example, at a movement interval of the portable information terminal or after a predetermined time has elapsed, based at least on the determined interval information and on the location information of the portable information terminal that is acquired repeatedly.

According to a second aspect of the present invention, there is provided a passenger location information system and an apparatus such as a portable information terminal used in the system, in which the network side, not the location information acquisition means in the portable information terminal side, acquires the location information and the server determines the location of transportation line interval in which each portable information terminal is located and delivers the passenger location information.

BRIEF DESCRIPTION OF THE DRAWINGS

FIG. 2 is a diagram showing an example of an interval information table used in the first embodiment of the present invention.

FIG. 5 is a diagram showing an example of an interval information table used in the second embodiment of the present invention.

FIG. 7 is a diagram showing an example of a transportation line interval information table used in the second embodiment of the present invention.

FIG. 8 is a diagram showing another example of a transportation line interval information table used in the second embodiment of the present invention.

FIG. 9 is a diagram showing the configuration of a system in a third embodiment of the present invention.

FIGS. 10a, 10b, 10c, 10d and 10e are diagrams showing the overview of the operation and the screen transition in the third embodiment of the present invention.

PREFERRED EMBODIMENTS OF THE INVENTION

Figure 1:
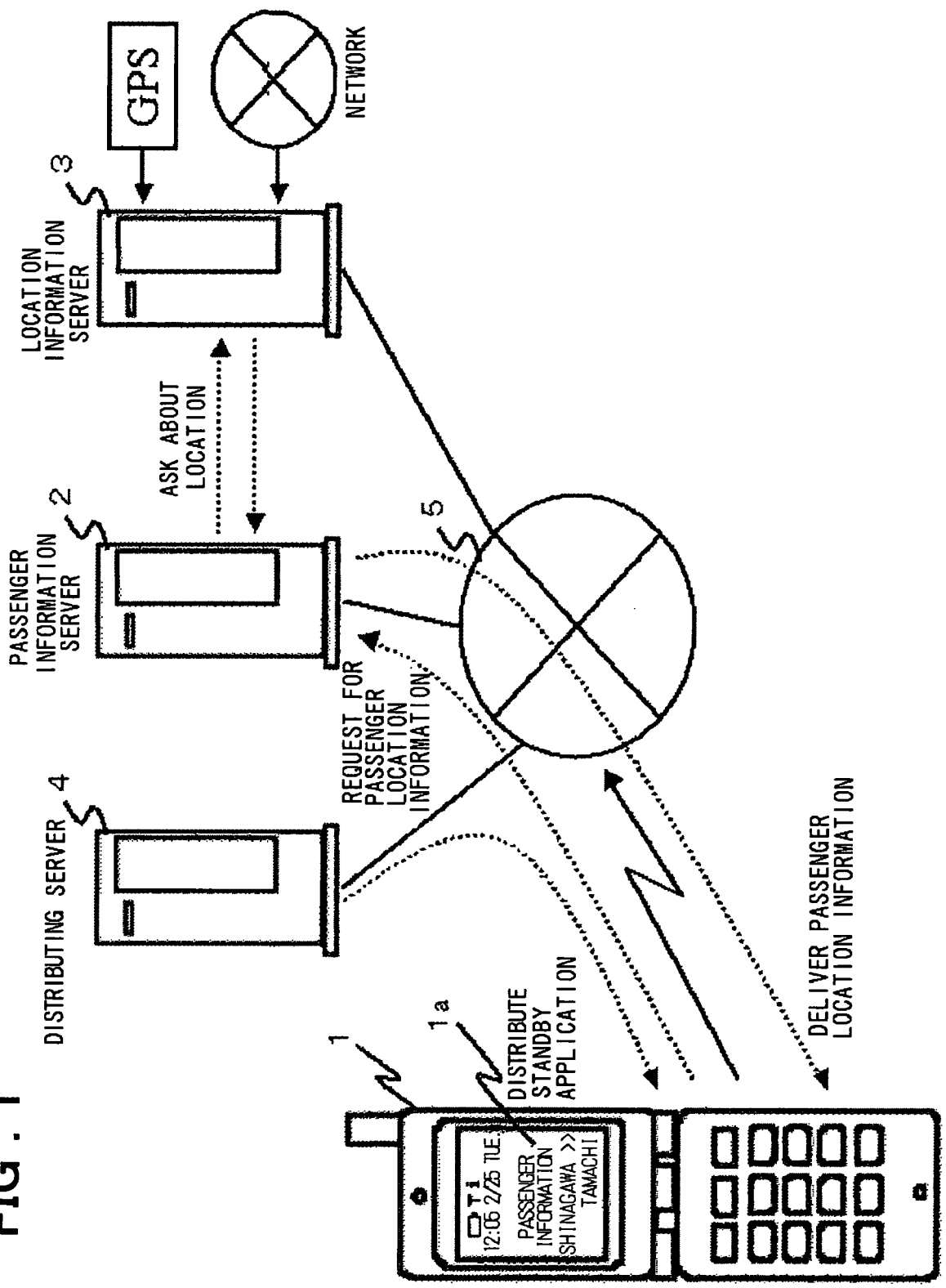
FIG. 1 is a diagram showing the configuration of a system in a first embodiment of the present invention.

The meritorious effects of the present invention are summarized as follows.

The passenger location information system, the portable information terminal, and the server according to the present invention provide a user with information on the current location of the user during a trip in real time and in a suitable mode.

Next, preferred embodiments of the present invention will be described. A passenger location information system according to the present invention comprises a portable user terminal (1 in FIG. 1) such as a mobile phone or a PDA (Personal Digital Assistant), a passenger information providing server (2 in FIG. 1) that functions as a presence server, a location information server (3 in FIG. 1) that provides location information on the user terminal (1 in FIG. 1), and a distributing server (4 in FIG. 1) that delivers an application.

The user terminal (1 in FIG. 1) is a portable information terminal with the function to execute an application coded in Java™ or other language and the function to connect to a communication network (5 in FIG. 1) such as the Internet. The passenger information providing server (2 in FIG. 1) comprises an interval determination processing unit that determines the interval of a transportation line, in which the user terminal is located, from the location information on the user terminal (1 in FIG. 1); and a passenger location information delivery unit that delivers passenger location information on a portable information terminal, at least including information on the names of the locations (station names, stop names, landmarks, and so on) of an interval, to the user terminal (1 in FIG. 1) in a predetermined time described below.

The location information server (3 in FIG. 1) comprises a location information acquisition unit that sends location information on each user terminal (1 in FIG. 1) to the passenger information providing server (2 in FIG. 1) based on the information on the base station or the information from the GPS (Global Positioning Satellite/System).

The distributing server (4 in FIG. 1) is a server comprising a distributing unit that distributes various applications and files in response to a request from the user terminal (1 in FIG. 1). The distributing server (4 in FIG. 1) in this embodiment refers to a server that distributes an application (the so-called standby application that is called a standby application in the description below) to the user terminal (1 in FIG. 1). This application program, coded in a programming language such as JAVA™, acts as a client program for the passenger information providing server (2 in FIG. 1) and runs at a call/message waiting time.

Next, the operation of this embodiment will be described. First, when the user starts operation, the user terminal (1 in FIG. 1) accesses the distributing server (4 in FIG. 1) via the function to connect to the network (5 in FIG. 1) and downloads the standby application that provides passenger location information.

Next, when the user performs an operation, for example, holds a predetermined button or selects a function, the user terminal (1 in FIG. 1) starts the standby application, moves to the passenger location information providing mode, and accepts the entry of a destination. After a destination is entered, the standby application starts accessing the passenger information providing server (2 in FIG. 1) at an interval of a predetermined time, for example, at an interval of a few seconds or a few minutes.

The passenger information providing server (2 in FIG. 1) asks the location information server (3 in FIG. 1) about the location information (latitude and longitude information from the GPS, base station information in Personal Handyphone System network, area code of the mobile telephone network, sector information on the mobile packet communication network, and so on) on the user terminal (1 in FIG. 1) from which the access request was received. Next, based on the position information received from the location information server (3 in FIG. 1), the passenger information providing server (2 in FIG. 1) uses the interval determination processing unit to reference a coordinate table or a coordinate map, which stores information on the correspondence between the location information and the interval information on the transportation line in which the user terminal (1 in FIG. 1) is located, and determines the interval of the transportation line.

The passenger information providing server (2 in FIG. 1) sends the determined interval information and the location information, received from the location information server (3 in FIG. 1), to the user terminal (1 in FIG. 1).

The user terminal (1 in FIG. 1) uses the standby application to generate passenger location information (1a in FIG. 1), which includes at least the names of the locations constituting the interval, based on received interval information and the location information and displays the generated result on the display. At this time, it is also possible that the user terminal (1 in FIG. 1) notifies the result via a vibrator or some other means based on the definition of a user's pre-specified operation that is executed when passenger location information is received.

The user terminal (1 in FIG. 1) performs the above-described operation repeatedly until it approaches the destination while updating the passenger location information at a predetermined interval of time. When the user terminal approaches the destination registered at standby application start time, that is, when the relation between the current location of the user terminal (1 in FIG. 1) and the destination satisfies a predetermined relation, the user terminal (1 in FIG. 1) displays a video on the display, starts the vibrator, or outputs a voice to notify the user.

An additional function can also be provided that causes the standby application executed in the user terminal (1 in FIG. 1) to sense a change in the location (information) and calculate the traveling acceleration. In this case, the user terminal (1 in FIG. 1) can display a video on the display, start the vibrator, or output a voice to notify the user at a more appropriate time by sensing a change in the acceleration, for example, when the train pulls in a station (station at which the user arrives).

First Embodiment

Next, a first embodiment of the present invention will be described in detail with reference to the drawings. FIG. 1 is a diagram showing the configuration of a system in this embodiment. Referring to FIG. 1, a user terminal 1 that functions as a portable information terminal, a passenger information providing server 2, a location information server 3, and a distributing server 4 are connected via a network 5.

The user terminal 1 is a mobile phone terminal comprising a control unit including the CPU not shown; a wireless communication unit used to perform voice communication, to send and receive data, or to connect to a network 5; an input/output unit such as buttons, a display, a speaker, or a vibrator; and a memory unit in which programs executed in the control unit and data are stored. In this embodiment, the user terminal 1 has the function to execute a Java™ coded application.

The passenger information providing server 2 is a server comprising a location information acquisition unit that asks the location information server 3 about the location information on the user terminal 1 to acquire it; an interval determination processing unit that determines an interval of the transportation line, in which the user is located, from the location information on the user terminal 1; and a passenger location information delivery unit that delivers passenger location information to the user terminal 1. The location information acquisition unit, the interval determination processing unit, and the passenger location information delivery unit, not shown, are composed of programs that are stored in the storage means of the server and are read for execution. In this embodiment in which the programs are always in execution in the server, the passenger information providing server 2 functions as a presence server that always provides each user terminal 1 with the resources.

The interval determination processing unit references the table stored in the storage unit, not shown, of the passenger information providing server 2 to determine an interval in which the user terminal is located. FIG. 2 is a diagram showing an example of the table. In this table, the interval information corresponding to the location information sent from the location information server 3 is stored.

The location information server 3 is a server comprising a location information acquisition unit that acquires the location information on each user terminal 1, based on the information acquired from the GPS or the base station information on the user terminal 1 from the network, and sends the acquired information to the passenger information providing server 2. The location information acquisition unit, not shown, of the location information server 3 is composed of the programs that are stored in the storage means of the server and are read for execution. The distributing server 4 is a server that performs accounting processing as necessary and distributes a Java™ coded application in response to a request from the user terminal 1.

Figure 3:
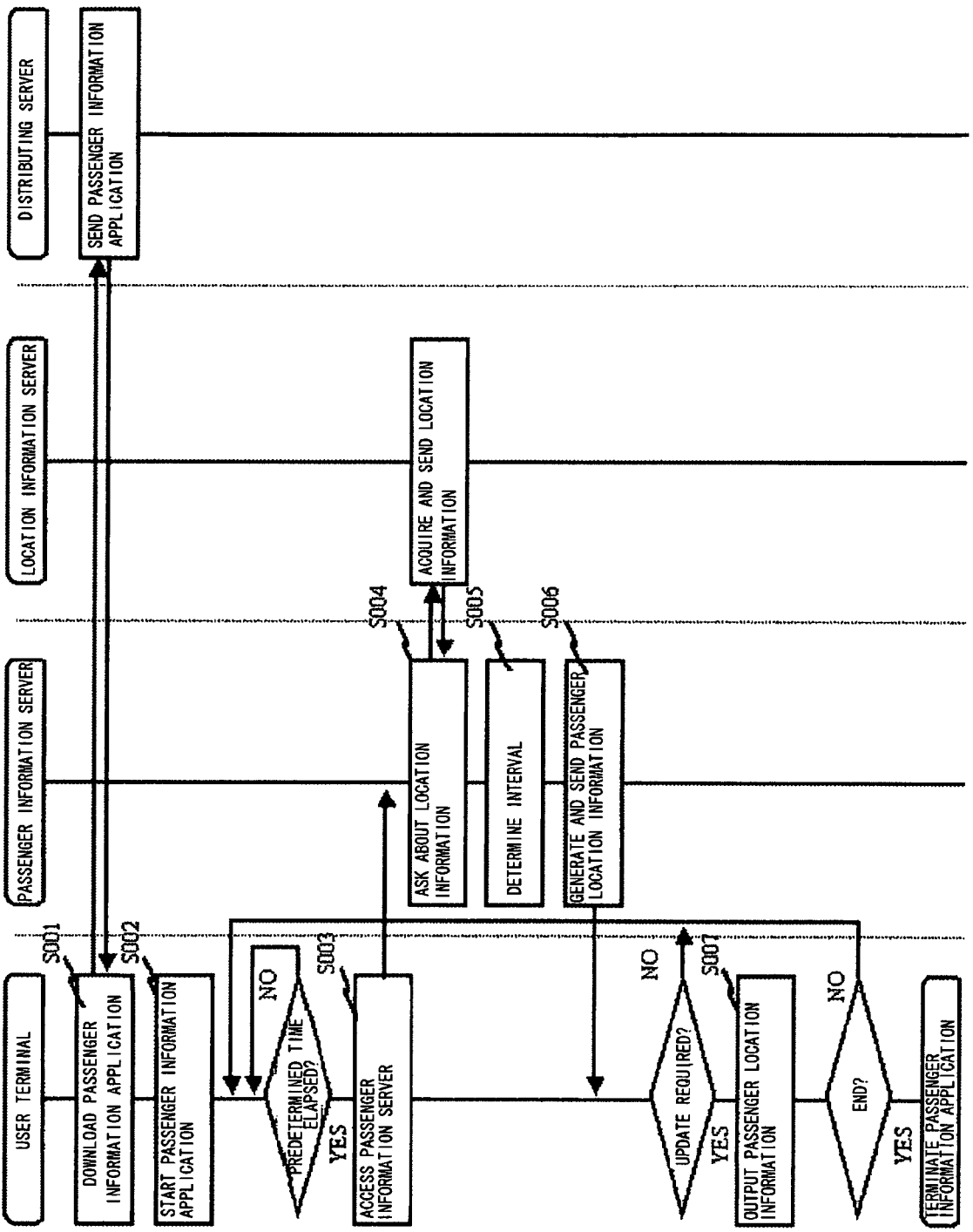
FIG. 3 is a flowchart showing the operation of the first embodiment of the present invention.

Next, the operation of this embodiment will be described in detail with reference to the drawings. FIG. 3 is a flowchart showing the operation of this embodiment. First, the user terminal 1 accesses the distributing server 4 to download the standby application, which functions as a client to the passenger information providing server 2, according to the menu screen provided by the distributing server 4 (step S001). Next, when the user starts the operation, the user terminal 1 starts the passenger information application (step S002).

The passenger information application started on the user terminal 1 starts accessing the passenger information providing server 2 at a predetermined time interval determined according to the need to update the passenger information based on the type of transportation for which passenger information is provided or according to the communication traffic or the processing capability of the user terminal and the servers (step S003).

The passenger information providing server 2, which is accessed by the user terminal 1, identifies the user terminal 1 using the ID and asks the location information server 3 about the location information (step S004). Upon receiving the location information from the location information server 3, the passenger information providing server 2 uses the interval determination processing unit to find the interval information corresponding to the received location information (step S005). Next, the passenger information providing server 2 sends the interval information to the user terminal 1 as the passenger location information for the user terminal 1 (step S006).

The user terminal 1, which receives the passenger location information, checks the received information to see if the received information is the same as the information that is displayed. If so, the user terminal 1 determines that the information need not be updated, returns control back to step S003, and waits there for a predetermined time. On the other hand, if the currently displayed passenger location information is required to be updated, for example, when the interval in which the user terminal is located is changed, the user terminal 1 outputs the received passenger location information on the display (step S007).

In step S007 described above, it is also possible to alert the user by outputting a ringing tone, turning on the LED lamp, or activating the vibrator at the same time the passenger location information is output.

The user terminal 1, the passenger information providing server 2, and the location information server 3 repeatedly perform the operation described above in the user terminal 1 until the standby application is terminated. If the standby application is kept stored in the user terminal 1 after terminated, step S001 described above can be omitted the next time the service is used.

As described above, the user (passenger) can confirm the location interval (currently Shinagawa station>>Tamachi station in FIG. 1), which is displayed as the passenger location information, on the portable information terminal. This means that the user need not check the station plate of a station in a crowded car in order to confirm the station. Another advantage is the ability to check the location with the terminal always at hand and to reduce the stress that the user might ride past the destination.

The portable information terminal is used not only in daily commuting but also in a private or business trip to an unfamiliar area to soften the resistance to the use of unfamiliar transportation.

For vision- or hearing-impaired persons, the conventional in-car announcement or display service has problems; for example, the announcement or the display is difficult to see or hear or the announcement time is too late. As described above, the present invention can complement an insufficient part of the conventional service. Those users can specify the output setting by combining the ringing tone generation, the character size change, and the vibrator activation according to the degree of the impairment so that they can receive the stress-free guidance information service that informs them where they are now and where they should leaves the train.

Second Embodiment

Figure 4:
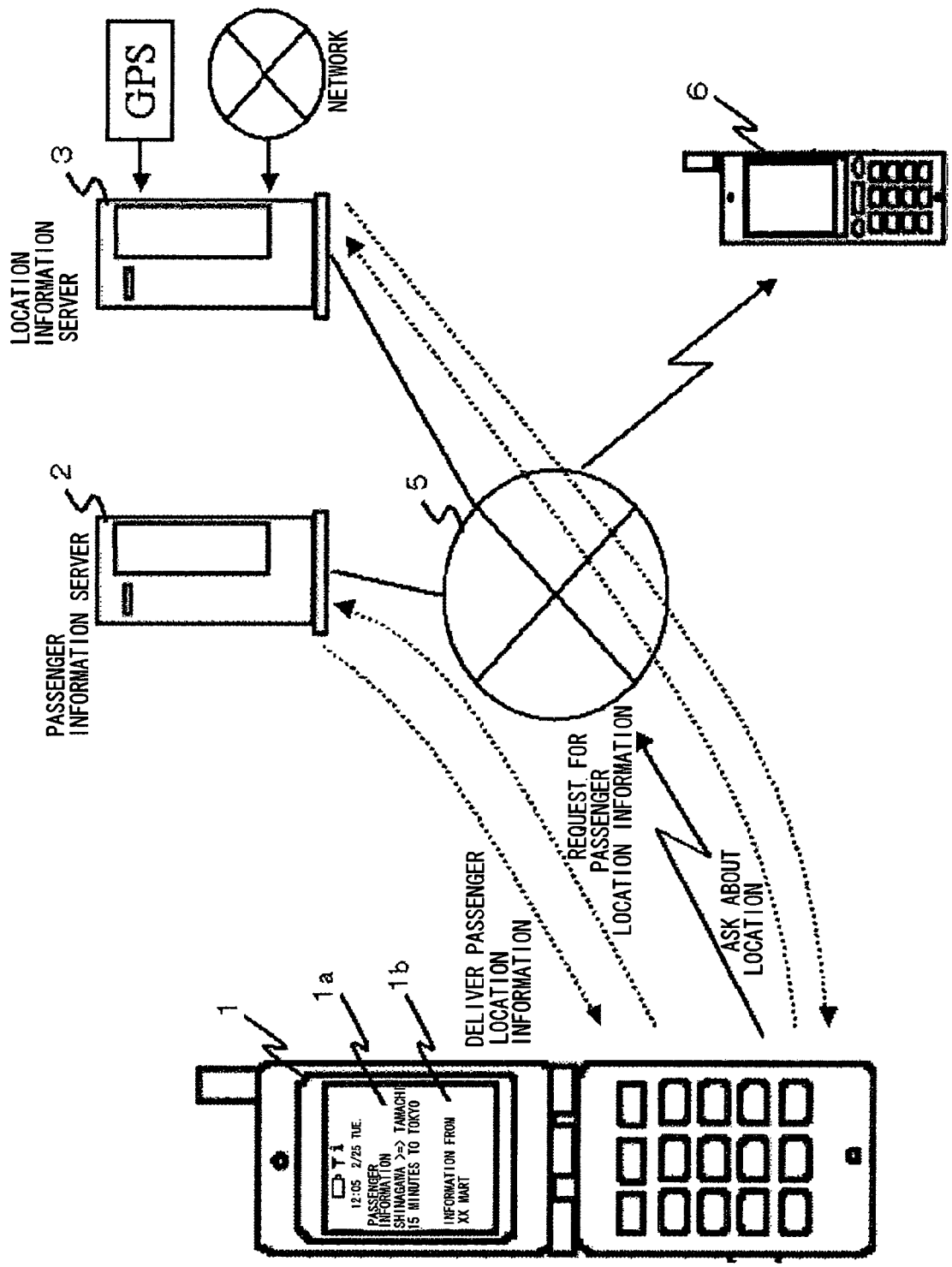
FIG. 4 is a diagram showing the configuration of a system in a second embodiment of the present invention.

Next, a second embodiment of the present invention will be describe in detail with reference to the drawings. FIG. 4 is a diagram showing the configuration of a system in this embodiment. Referring to FIG. 4, a user terminal 1 that functions as a portable information terminal, a passenger information providing server 2, and a location information server 3 are connected via a network 5. In the description below, the description of a part also included in the first embodiment of the present invention described above is omitted.

The user terminal 1 is a mobile phone terminal comprising a control unit including the CPU not shown; a wireless communication unit used to perform voice communication, to send and receive data, or to connect to a network 5; an input/output unit such as buttons, a display, a speaker, or a vibrator; a memory unit in which programs executed in the control unit and data are stored; and a location information acquisition unit that asks the location information server 3 about the location information on the user terminal. In this embodiment, the user terminal 1 is assumed to have the access function (corresponding to the position information acquisition unit described above) included in advance as a built-in program, wherein this access function accesses the passenger information providing server that will be described later.

The passenger information providing server 2 is a server comprising an interval determination processing unit that determines an interval of the transportation line, in which the user is located, from the location information on the user terminal 1; a passenger location information delivery unit that delivers passenger location information to the user terminal 1; and a transportation line information storage unit that stores transportation line information including the required traveling time of each transportation line interval. The interval determination processing unit and the passenger location information delivery unit, not shown, are composed of programs that are stored in the storage means of the server and are read for execution. In addition, the passenger information providing server 2, which stores advertisement contents in its storage unit, also works as an advertisement delivery server.

The interval determination processing unit of the passenger information providing server 2 references the table stored in the storage unit, not shown, of the passenger information providing server 2 to determine an interval in which the user terminal is located as well as the traveling direction. FIG. 5 is a diagram showing an example of the table. This table is composed to be able to acquire the directional indicating interval information based on the previously acquired location information and the current location information sent from the location information server 3. For example, FIG. 5 indicates that, if the current location information Pt is "A002" and the previously acquired location information Pt−1 is "A001", then the interval information "Shinagawa>=>Tamachi" indicating that the passenger is traveling from Shinagawa to Tamachi is obtained. If the current location information Pt is "A001" and the previously acquired location information Pt−1 is "A002", then the information "Tamachi>=>Shinagawa" indicating that the passenger is traveling from Tamachi to Shinagawa is obtained.

The location information server 3 is a server comprising a location information acquisition unit that acquires the location information on each user terminal 1 from the GPS or the base station information on the user terminal 1 received from the network and sends the acquired information to the user terminal 1.

Figure 6:
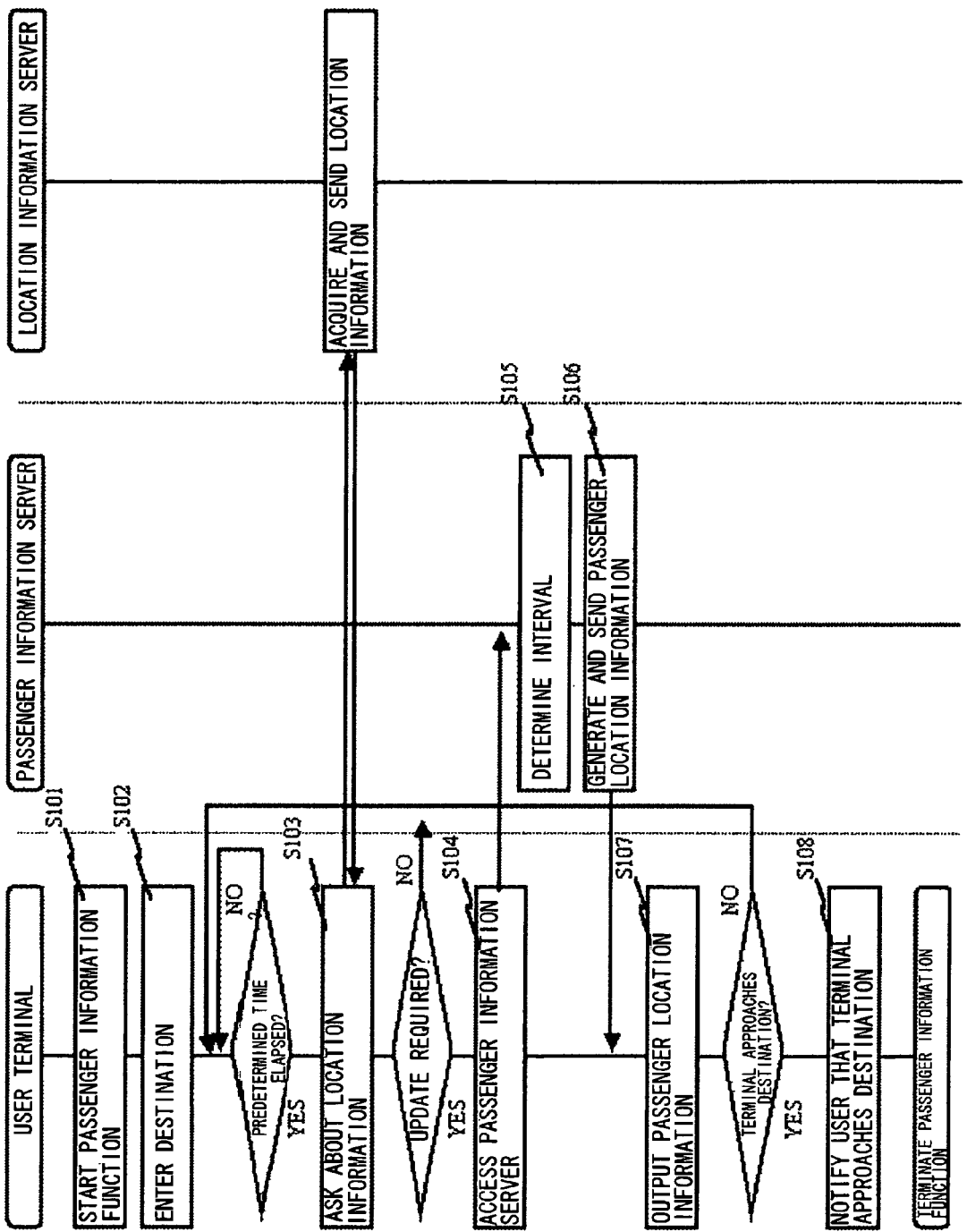
FIG. 6 is a flowchart showing the operation of the second embodiment of the present invention.

Next, the operation of this embodiment will be described in detail with reference to the drawings. FIG. 6 is a flowchart showing the operation of this embodiment. First, the user of the user terminal 1 selects and starts the passenger location information output function according to the menu screen provided as an additional function of a mobile phone terminal (step S101).

When the passenger location information output function is started, the user terminal 1 displays the destination input screen to the user and requests the user to input the destination and notification trigger(time; notification condition) such as the station two stations before the destination station or a time 10 minutes before the estimated time of arrival (step S102). Next, the user terminal 1 accesses the location information server 3 at a predetermined time interval and starts monitoring its own location information (step S103).

As the user terminal travels, the user terminal 1, which receives the location information, checks the difference between the current location information and the previously acquired location information and, if the difference satisfies a predetermined condition, determines that updating is required. Then, the user terminal 1 starts accessing the passenger information providing server 2 and sends the destination information and the location information to it (step S104).

When accessed by the user terminal 1, the passenger information providing server 2 uses the interval determination processing unit to find the interval information corresponding to the location information received from the user terminal 1 and the previously received location information (step S105). Next, the passenger information providing server 2 references the transportation line information and calculates the traveling time required to arrive at the destination identified by the destination information received from the user terminal 1. In addition, the passenger information providing server 2 generates the passenger location information for the user terminal 1, including an advertisement content 1b to be displayed in conjunction with the passenger location information, and sends the passenger location information to the user terminal 1 (step S106).

The following describes an example of the method for calculating the time required for arriving at the destination. FIG. 7 is a diagram showing an example of a transportation line information table in which the required traveling times of the transportation intervals are stored. Referring to FIG. 7, the transportation line information table stores information indicating that the required time for the interval "Shinagawa-Tamachi" is three minutes and that the required time for the interval "Tamachi-Hamamatuchou" is two minutes. As is apparent from the transportation line information table shown in FIG. 7, if the current location (information) is near "Shinagawa" and the destination is "Hamamatuchou", then the passenger information providing server 2 adds up (calculates the total of) the required times of the intervals and finds the required time of five minutes. Also, if the current location is a location (information) corresponding to one minute from "Shinagawa", the passenger information providing server 2 calculates the required time of four minutes. For more strict calculation, it is also possible to calculate a more accurate required time considering a transportation delay by checking the location (information) corresponding to the current location against the location (information) corresponding to one minute of elapsed time calculated by interpolation. If the transportation line information table stores required times in the time format used in the timetable of transportation, the time may also be checked against the time of the built-in clock of the user terminal for correcting the time. In addition, it is also possible to output the estimated time of arrival by adding up the times of the built-in clock of the user terminal.

If the transportation line information table stores, not information based on transportation line intervals, but detailed information based on required times between locations (information), such as "A001-A002"=30 seconds, "A002-A003"=20 seconds, and so on, as shown in FIG. 8, it is also possible to add up (calculate the total of) the required times of the intervals to provide more detailed required times.

Referring to FIG. 6 again, the user terminal 1 that receives the passenger location information outputs the passenger location information on the display (step S107). In this embodiment, the passenger location information contains not only the interval information but also information on the traveling direction of the user as well as the advertisement content 1b. As shown in FIG. 4, all the information need not be output on one screen at a time but may be displayed as one unit of information through scrolling or screen switching.

When the location information indicates that the terminal approaches the destination entered in step S102 and the notification time (timing) has arrived (the notification condition is satisfied), the user terminal 1 performs the advance-notice operation, for example, activates the vibrator or sounds the ringing tone, to notify the user (step S108).

As described above, this embodiment provides the user with an additional function, that is, the station-passing prevention function or doze-over prevention function, by allowing the user to register a destination and a notification time (condition), in advance, at which the user will be notified that the user is approaching the destination. Of course, the user is able to select whether the notification time (condition) described above is stored only once for a private or business trip or permanently for commuting. At the same time, the user is able to set the notification time after the user rides into a car or goes through the ticket gate for non-daily use.

When the distance between location information points is known or predefined, it is also preferable that the user terminal 1 determines a change in the speed (degree of deceleration) of the car, in which the user is riding, from the degree of change in the location information points at each point in time and, then, notifies a more accurate time (timing) either by combining it with the notification time (condition) described above or singly. Although the arrival advance-notice operation in this case (second arrival advance-notice operation) should preferably be executed differently from the above-described arrival advance-notice operation activated when the terminal approaches the destination in order to alert the user more strongly, it is also possible to repeatedly perform the same arrival advance-notice operation as the one executed when the terminal approaches the destination. In either case, the operation executed in this embodiment is efficient not only for preventing the user from passing the station or dozing over but also for relieving the stress in a car. Thus, the user finds greater comfort in a car that would otherwise be decreased and, in addition, the service of the passenger transport companies to the customers is improved.

According to the configuration of this embodiment, passenger location information is output on the display of the user terminal 1. In addition, the passenger location information can be transferred to some other user's terminal 6 via the passenger information server 2 or another information processing unit using electronic mail or SMS (Short Message Service). For example, when the owner of the user terminal 1 is an infant or an old person, the passenger location information is transferred to the other user's terminal 6 to accurately notify the parent or guardian of the location.

In addition, because the user views the screen of the portable terminal in a car, the generated passenger location information is combined with advertisements, service notices, and area guidance messages in this embodiment. It is possible that the service provider can provide this service at a lower cost or free of charge if advertisement charges are collected from advertisers. The attribute information (age, sex, profession, location, time) on the users, if collected when or after the user becomes a member of the service, can also be used to deliver advertisements selected based on the attribute of each user.

Third Embodiment

Next, a third embodiment of the present invention will be described in detail with reference to the drawings. FIG. 9 is a diagram showing the configuration of the system in this embodiment. Referring to FIG. 9, a user terminal 1, which functions as a portable information terminal, and a content server 7 are connected via a network 5. In the description below, the description of a part also included in the first embodiment of the present invention described above is omitted.

The user terminal 1 is a mobile phone terminal comprising a control unit including the CPU not shown; a wireless communication unit used to perform voice communication, to send and receive data, or to connect to a network 5; an input/output unit such as buttons, a display, a speaker, or a vibrator; a memory unit in which programs executed in the control unit and data are stored; a location information acquisition unit that acquires coordinate information on the terminal from the GPS; and an interval determination processing unit that determines the transportation line interval in which the terminal is located. In addition, the memory unit of the user terminal 1 in this embodiment stores the table for determining interval information, similar to that in the first and second embodiments described above, as well as transportation line information including the information on transportation line interval fares. At the same time, the location information acquisition unit and the interval determination processing unit are installed in the mobile phone terminal as built-in programs.

The content server 7 is a server that stores service contents for passengers and sends them to the user terminal 1.

Next, the operation of this embodiment will be described in detail with reference to the drawings. FIGS. 10a-10e are diagrams showing the screen transition for describing the operation of this embodiment. First, the user of the user terminal 1 accesses the transportation line search engine, provided as a service of the mobile phone terminal network, enters the starting location and the destination according to the input screen, and searches for a route (see FIG. 10a).

After that, when the search result is returned and displayed on the display (see FIG. 10b), the user terminal 1 moves to the passenger location information providing mode, sets the search result as a scheduled route, and starts the location information acquisition unit and the interval determination processing unit. In the following description, it is assumed that the route is established as "A station->B station; abc line, B station->C station; def line".

Next, when the user leaves for the A station, the coordinates of the user terminal 1 are obtained by the GPS via the location information acquisition unit of the user terminal 1. The interval determination processing unit of the user terminal 1 checks the coordinates of the user terminal 1 against the location information in the table described above to determine if the user has arrived at the A station.

When it is determined that the user has arrived at the A station, the user terminal 1 uses a predetermined area in the back-side display of the user terminal as an area for displaying the passenger information and outputs the passenger location information in that area. FIG. 10c shows a user terminal on which passenger location information is output, wherein the information includes the interval information as well as the information on the fare calculated from the transportation line information stored in the memory unit. After that, the user terminal 1 uses the location information (coordinates) acquired by the location information acquisition unit and the table stored in the memory unit to determine the transportation line interval in which the terminal is located in the same way as described above and outputs the passenger location information in the area for displaying the passenger information (see FIG. 10d).

When the terminal approaches the destination and the notification condition specified by the user in advance is satisfied, the user terminal 1 outputs an arrival advance-notice message such as the one shown in FIG. 10e.

As described above, the user terminal 1 in this embodiment can generate and output passenger location information on its own. As compared with the system described in the first and second embodiments, the system in this embodiment reduces the communication cost and provides a better service without being affected by the network traffic or other system environments.

In the third embodiment of the present invention, the search engine is used first to set up a user's route automatically as described above to eliminate the need for the user to enter the destination or to select a route. Alternatively, the user can of course use an existing transportation line search engine or an operation information providing service to set up a route, or can enter route information from other information processing systems that are used when the user uses transportation. Examples of those other information processing systems are a terminal on which the user can get a ticket with an IC card or a mobile phone and a ticket vending terminal or a terminal installed in a station. In the above description, the user terminal 1 obtains location information primarily from the GPS system. Alternatively, the location information can of course be entered secondarily from a wireless terminal installed in a station, a route, or a car with which the user terminal can communicate.

In addition, this embodiment has a configuration that also allows the content server 7 to deliver a message 1c, received from the a passenger transport company, to a user terminal 1 and output the message in real time. For example, it is possible to deliver "Service Suspension Notice" as necessary as shown in FIG. 9. Also included in this type of message is information on a change in train schedule, instructions on manners in a car, and the transfer of passengers due to the suspension of services.

The embodiments of the present invention have been described. The system according to the present invention is not limited by a means of transportation but is applicable to any means of transportation such as a railway, a bus, a ship, and an airplane that provides services for a transportation service line. In particular, because the user sometimes does not know well about the names of bus lines and bus stops, the location relation, and the routes in the route bus service, the present invention can provide accurate location information and prompt the user to leave the bus at a correct stop (push the "stop" button).

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A portable information terminal comprising:
   location information acquisition means for acquiring location information on said portable information terminal at a predetermined time interval; and
   means for determining a transportation being used by a user of said portable information terminal from location information on said portable information terminal wherein,
   when predetermined information is input, said portable information terminal moves to a passenger location information providing mode,
   automatically determines a transportation line interval in which said portable information terminal is located based on the location information on said portable information terminal; and
   repeatedly determines passenger location information, which at least includes information on names of locations constituting the transportation line interval, at a predetermined time.

2. A portable information terminal comprising:
   location information acquisition means for acquiring location information on said portable information terminal at a predetermined time interval;
   means for inputting destination information on a trip; and
   means for determining a transportation being used by a user of said portable information terminal from the location information on said portable information terminal wherein,
   when predetermined information is input, said portable information terminal moves to a passenger location information providing mode,
   inquires destination information on a trip from user and inputs it,
   automatically determines a transportation line interval in which said portable information terminal is located based on the location information on said portable information terminal and the destination information; and
   repeatedly determines passenger location information, which at least includes information on names of locations constituting the transportation line interval, at a predetermined time.

3. The portable information terminal as defined by claim 2, further comprising
   means for storing transportation line information at least including a required time of each interval of each transportation wherein
   said portable information terminal calculates and outputs an estimated time of arrival to the destination based on a time required to arrive at the destination and on a current time and
   executes a predetermined arrival advance-notice operation when a relation between the destination and the location information on said portable information terminal satisfies a predetermined condition.

4. The portable information terminal as defined by claim 2, further comprising:
  means for calculating a traveling acceleration of said portable information terminal based on a change in the location information wherein
  a predetermined second arrival advance-notice operation is executed when the traveling acceleration of said portable information terminal fall below a predetermined threshold value.

5. The portable information terminal as defined by claim 2 further comprising:
  means for sending at least the passenger location information to a predetermined other terminal.

6. The portable information terminal as defined by claim 2 wherein
  said portable information terminal has a passenger location information display area, in which the location information is output in the passenger location information providing mode, on a display and
  outputs at least the passenger location information in the passenger location information display area.

7. The portable information terminal as defined by claim 2 wherein
  said portable information terminal receives an advertisement content from a predetermined advertisement server and
  outputs the passenger location information as well as the advertisement content.

8. The portable information terminal as defined by claim 2 wherein
  said portable information terminal receives user's attribute information including the location information on said portable information terminal and sends the user attribute information to a predetermined advertisement server and
  receives an advertisement content, which matches the attribute of the user of said portable information terminal, from the advertisement server and outputs the passenger location information as well as the advertisement content.

9. A portable information terminal connectable to a passenger information providing server comprising means for determining a transportation line interval, in which said portable information terminal is located, from location information on said portable information terminal, said portable information terminal comprising:
  location information acquisition means for acquiring location information on said portable information terminal wherein,
  when predetermined information is input, said portable information terminal moves to a passenger location information providing mode,
  sends the location information on said portable information terminal, acquired from said location information acquisition means, to said passenger information providing server at a predetermined time interval and receives a determination result of the transportation line interval in which said portable information terminal is located, and
  repeatedly determines passenger location information, which at least includes information on names of locations constituting the transportation line interval, at a predetermined time, based at least on the determined transportation line interval information and the location information on said portable information terminal acquired repeatedly.

10. A portable information terminal connectable to a passenger information providing server comprising means for determining a transportation line interval, in which said portable information terminal is located, from a location on said portable information terminal and a destination, said portable information terminal comprising:
  location information acquisition means for acquiring location information on said portable information terminal; and
  means for inputting destination information on a trip wherein,
  when predetermined information is input, said portable information terminal moves to a passenger location information providing mode,
  inquires destination information on a trip from user and inputs it,
  sends the location information on said portable information terminal, acquired from said location information acquisition means, and the destination information to said passenger information providing server at a predetermined time interval and receives a determination result of the transportation line interval in which said portable information terminal is located; and
  repeatedly determines passenger location information, which at least includes information on names of locations constituting the transportation line interval, at a predetermined time, based at least on the determined transportation line interval information and the location information on said portable information terminal acquired repeatedly.

11. The portable information terminal as defined by claim 10, wherein
  said portable information terminal is connectable to a server which stores transportation line information including at least a required time of each interval of each transportation,
  inquires said server, which stores transportation line information, about an estimated time of arrival to the destination, based on a required time to the destination and a current time, and outputs the estimated time of arrival, and
  executes a predetermined arrival advance-notice operation when a relation between the destination and the location information on said portable information terminal satisfies a predetermined condition.

12. The portable information terminal as defined by claim 10, further comprising:
  means for calculating a traveling acceleration of said portable information terminal based on a change in the location information wherein
  a predetermined second arrival advance-notice operation is executed when the traveling acceleration of said portable information terminal fall below a predetermined threshold value.

13. The portable information terminal as defined by claim 10 further comprising:
  means for sending at least the passenger location information to a predetermined other terminal.

14. The portable information terminal as defined by claim 10 wherein
  said portable information terminal has a passenger location information display area, in which the location information is output in the passenger location information providing mode, on a display and
  outputs at least the passenger location information in the passenger location information display area.

15. The portable information terminal as defined by claim 10 wherein
said portable information terminal receives an advertisement content from a predetermined advertisement server and
outputs the passenger location information as well as the advertisement content.

16. The portable information terminal as defined by claim 10 wherein
said portable information terminal receives user's attribute information including the location information on said portable information terminal and sends the user attribute information to a predetermined advertisement server and
receives an advertisement content, which matches the attribute of the user of said portable information terminal, from the advertisement server and outputs the passenger location information as well as the advertisement content.

17. A portable information terminal connected to a passenger information providing server comprising location information acquisition means for acquiring location information on each portable information terminal at a predetermined time interval; means for determining a transportation line interval, in which said portable information terminal is located, from a location of said portable information terminal and a destination; and passenger location information delivery means for generating and sending passenger location information corresponding to the transportation line interval information, said portable information terminal comprising:
means for inputting destination information on a trip wherein
when predetermined information is input, said portable information terminal moves to a passenger location information providing mode,
inquires destination information on a trip from user and inputs it,
sends the destination information to said passenger information providing server, and
requests said passenger information providing server for the passenger location information at a predetermined time interval, and
repeatedly determines the passenger location information at a predetermined time, wherein
said portable information terminal is connectable to a server which stores at least transportation line information including a required time of each interval of the transportation,
inquires said server, which stores transportation line information, about an estimated time of arrival to the destination based on a time required to arrive at the destination via the determined transportation and on a current time and outputs the estimated time of arrival, and
executes a predetermined arrival advance-notice operation when a relation between the destination and the location information on said portable information terminal satisfies a predetermined condition.

18. A portable information terminal connected to a passenger information providing server comprising location information acquisition means for acquiring location information on each portable information terminal at a predetermined time interval; means for determining a transportation line interval, in which said portable information terminal is located, from a location of said portable information terminal and a destination; and passenger location information delivery means for generating and sending passenger location information corresponding to the transportation line interval information, said portable information terminal comprising:
means for inputting destination information on a trip wherein
when predetermined information is input, said portable information terminal moves to a passenger location information providing mode,
inquires destination information on a trip from user and inputs it,
sends the destination information to said passenger information providing server, and
requests said passenger information providing server for the passenger location information at a predetermined time interval, and
repeatedly determines the passenger location information at a predetermined time, further comprising:
means for calculating a traveling acceleration of said portable information terminal based on a change in the location information wherein
a predetermined second arrival advance-notice operation is executed when the traveling acceleration of said portable information terminal fall below a predetermined threshold value.

19. A portable information terminal connected to a passenger information providing server comprising location information acquisition means for acquiring location information on each portable information terminal at a predetermined time interval; means for determining a transportation line interval, in which said portable information terminal is located, from a location of said portable information terminal and a destination; and passenger location information delivery means for generating and sending passenger location information corresponding to the transportation line interval information, said portable information terminal comprising:
means for inputting destination information on a trip wherein
when predetermined information is input, said portable information terminal moves to a passenger location information providing mode,
inquires destination information on a trip from user and inputs it,
sends the destination information to said passenger information providing server, and
requests said passenger information providing server for the passenger location information at a predetermined time interval, and
repeatedly determines the passenger location information at a predetermined time, wherein
at least the passenger location information is sent to a predetermined other terminal.

20. A portable information terminal connected to a passenger information providing server comprising location information acquisition means for acquiring location information on each portable information terminal at a predetermined time interval; means for determining a transportation line interval, in which said portable information terminal is located, from a location of said portable information terminal and a destination; and passenger location information delivery means for generating and sending passenger location information corresponding to the transportation line interval information, said portable information terminal comprising:
means for inputting destination information on a trip wherein
when predetermined information is input, said portable information terminal moves to a passenger location information providing mode, inquires destination information on a trip from user and inputs it, sends the destination information to said passenger information providing server, and requests said passenger information providing server for the passenger location information at a predetermined time interval, and repeatedly determines the passenger location information at a predetermined time, wherein said portable information terminal has a passenger location information display area, in which the location information is output in the passenger location information providing mode, on a display and outputs at least the passenger location information in the passenger location information display area.

21. A portable information terminal connected to a passenger information providing server comprising location information acquisition means for acquiring location information on each portable information terminal at a predetermined time interval; means for determining a transportation line interval, in which said portable information terminal is located, from a location of said portable information terminal and a destination; and passenger location information delivery means for generating and sending passenger location information corresponding to the transportation line interval information, said portable information terminal comprising:

means for inputting destination information on a trip wherein when predetermined information is input, said portable information terminal moves to a passenger location information providing mode, inquires destination information on a trip from user and inputs it, sends the destination information to said passenger information providing server, and requests said passenger information providing server for the passenger location information at a predetermined time interval, and repeatedly determines the passenger location information at a predetermined time, wherein said portable information terminal receives an advertisement content from a predetermined advertisement server and outputs the passenger location information as well as the advertisement content.

22. A portable information terminal connected to a passenger information providing server comprising location information acquisition means for acquiring location information on each portable information terminal at a predetermined time interval; means for determining a transportation line interval, in which said portable information terminal is located, from a location of said portable information terminal and a destination; and passenger location information delivery means for generating and sending passenger location information corresponding to the transportation line interval information, said portable information terminal comprising:

means for inputting destination information on a trip wherein when predetermined information is input, said portable information terminal moves to a passenger location information providing mode, inquires destination information on a trip from user and inputs it, sends the destination information to said passenger information providing server, and requests said passenger information providing server for the passenger location information at a predetermined time interval, and repeatedly determines the passenger location information at a predetermined time, wherein said portable information terminal receives user's attribute information including the location information on said portable information terminal and sends the user attribute information to a predetermined advertisement server and receives an advertisement content, which matches the attribute of the user of said portable information terminal, from the advertisement server and outputs the passenger location information as well as the advertisement content.

23. A passenger location information system comprising:
the portable information terminal as defined by claim 2; and
a content server that delivers the passenger location information, as well as a content to be displayed, to said portable information terminal in response to attribute information sent from said portable information terminal and including the location information on said portable information terminal, wherein
said portable information terminal and said content server are connected via a network.

24. A passenger location information system comprising:
a passenger information providing server comprising at least means for determining a transportation line interval, in which a portable information terminal is located, from location information on said portable information terminal and a destination;
the portable information terminal as defined by claim 10; and
a content server that delivers the passenger location information, as well as a content to be displayed, to said portable information terminal in response to attribute information sent from said passenger information providing server or said portable information terminal and including the location information on said portable information terminal, wherein
said passenger information providing server, said portable information terminal, and said content server are connected via a network.

25. A passenger location information system comprising:
a passenger information providing server comprising:
means for acquiring location information on a portable information terminal;
means for determining a transportation line interval, in which said portable information terminal is located, from the location information on said portable information terminal and a destination; and
passenger location information delivery means for generating and sending passenger location information corresponding to the transportation line interval information;
a portable information terminal connected to the passenger information providing server, the portable information terminal comprising:
means for inputting destination information on a trip wherein, when predetermined information is input, said portable information terminal:
moves to a passenger location information providing mode,
inquires destination information on a trip from the user and inputs it,
sends the destination information to said passenger information providing server, requests said passenger information providing server for the passenger location information at a predetermined time interval, and repeatedly determines the passenger location information at a predetermined time; and a content server that delivers the passenger location information, as well as a content to be displayed, to said portable information terminal in response to attribute information sent from said passenger information providing server or said portable information terminal and including the location information on said portable information terminal, wherein said passenger information providing server, said portable information terminal, and said content server are connected via a network.

26. A passenger information providing server at least comprising:

means for determining a transportation line interval, in which a portable information terminal is located, from location information on said portable information terminal and a destination; and means for sending the determination result of a transportation line interval, in which each portable information terminal is located, to the portable information terminal as defined by claim 10.

27. A passenger information providing server comprising:

means for acquiring location information on each portable information terminal;

means for determining a transportation line interval, in which a portable information terminal is located, at least from the location information on said portable information terminal and a destination; and passenger location information delivery means for generating and sending passenger location information corresponding to the transportation line interval information in response to a request from the portable information terminal;

wherein the portable information terminal comprises:

means for inputting destination information on a trip wherein when predetermined information is input, said portable information terminal:

moves to a passenger location information providing mode, inquires destination information on a trip from user and inputs it, sends the destination information to said passenger information providing server, requests said passenger information providing server for the passenger location information at a predetermined time interval, and repeatedly determines the passenger location information at a predetermined time.

* * * * *